United States Patent [19]

Shu

[11] Patent Number: 5,086,089

[45] Date of Patent: Feb. 4, 1992

[54] PROGRAMMED GELATION OF POLYMERS USING MELAMINE RESINS

[75] Inventor: Paul Shu, West Windson, N.J.

[73] Assignee: Mobil Oil Corporation, Fairfax, Va.

[21] Appl. No.: 565,595

[22] Filed: Aug. 10, 1990

Related U.S. Application Data

[62] Division of Ser. No. 431,419, Nov. 3, 1989, Pat. No. 4,964,461.

[51] Int. Cl.$^5$ .............. C09K 7/00; C08C 19/22; C08F 8/32; C08G 8/30

[52] U.S. Cl. .................. 523/130; 525/374; 525/375; 525/380; 525/382; 525/518; 525/519

[58] Field of Search .............. 523/130; 525/374, 375, 525/380, 382, 518, 519

[56] References Cited

U.S. PATENT DOCUMENTS

| | | | |
|---|---|---|---|
| 3,305,016 | 2/1967 | Lindom et al. | 166/9 |
| 3,810,882 | 5/1974 | Browning et al. | 260/209 |
| 3,908,760 | 9/1975 | Clampitt et al. | 166/246 |
| 3,918,521 | 11/1975 | Snavely, Jr. et al. | 166/272 |
| 4,009,755 | 3/1977 | Sandiford | 166/270 |
| 4,069,869 | 1/1978 | Sandiford | 166/270 |
| 4,157,322 | 6/1979 | Colegrove | 260/15 |
| 4,342,866 | 8/1982 | Kang et al. | 536/119 |
| 4,413,680 | 11/1983 | Sandiford et al. | 166/270 |
| 4,479,894 | 10/1984 | Chen et al. | 252/8.55 |
| 4,489,783 | 12/1984 | Shu | 166/272 |
| 4,565,249 | 1/1986 | Pebdani et al. | 166/303 |
| 4,606,407 | 8/1986 | Shu | 166/270 |
| 4,644,020 | 2/1987 | Stahl | 522/79 |
| 4,658,898 | 4/1987 | Paul et al. | 166/270 |
| 4,716,966 | 1/1988 | Shu | 166/295 |
| 4,776,398 | 10/1988 | Chu et al. | 166/274 |
| 4,787,451 | 11/1988 | Mitchell | 166/270 |
| 4,793,416 | 12/1988 | Mitchell | 166/266 |
| 4,810,732 | 3/1989 | Shu | 523/130 |
| 4,834,130 | 5/1989 | Shu | 166/270 |
| 4,903,767 | 2/1990 | Shu et al. | 523/130 |

Primary Examiner—Paul R. Michl
Assistant Examiner—Patrick Niland
Attorney, Agent, or Firm—Alexander J. McKillop; Charles J. Speciale; Michael J. Mlotkowski

[57] ABSTRACT

A process for use with a polymer which is crosslinkable by reaction with an amino resin, which comprises the steps of determining a period of time within which full gelation of the polymer is to be achieved; preparing a gel-forming aqueous-based mixture comprising the polymer, a rapid amino resin crosslinking agent and a delayed amino resin crosslinking agent, the gel-forming aqueous-based mixture capable of complete gelation within the period of time so determined; partially gelling the aqueous-based mixture by reacting the polymer with the rapid amino resin crosslinking agent which is effective to complete the partial gelation by crosslinking the polymer within four hours; and fully gelling the aqueous-based mixture by reacting the polymer with the delayed amino resin crosslinking agent which is effective to complete the full gelation by crosslinking the polymer within the period of time so determined. A method of enhancing the recovery of oil from a subterranean oil-bearing formation is also provided.

10 Claims, No Drawings

PROGRAMMED GELATION OF POLYMERS USING MELAMINE RESINS

This is a division of copending application Ser. No. 431,419, filed on Nov. 3, 1989, now U.S. Pat. No. 4,964,461.

FIELD OF THE INVENTION

This invention relates to organically crosslinked polymeric gels and to the use thereof in controlling the permeability of subterranean oil-bearing formations and, more particularly, to a method for controlling the rate at which gelation takes place in order to control the permeability of the oil-bearing formations more effectively.

BACKGROUND OF THE INVENTION

Generally, in the production of oil from subterranean formations, only a small fraction of the total formation oil can be recovered through the use of primary recovery methods which utilize only the natural forces present in the reservoir. To recover additional oil, a variety of supplemental production techniques have been developed. In these supplemental techniques, commonly referred to as secondary or tertiary recovery operations, a fluid is introduced into the oil-bearing formation in order to displace oil to a production system comprising one or more production wells. The displacing or "drive" fluid may be an aqueous liquid such as brine or fresh water, a gas such as carbon dioxide, steam or dense-phase carbon dioxide, an oil-miscible liquid such as butane, or an oil and water-miscible liquid such as an alcohol. Often, the most cost-effective and desirable secondary recovery methods involve the injection of steam. In practice, a number of injection and production wells will be used in a given field arranged in conventional patterns such as a line drive, a five spot or inverted five spot, or a seven spot or inverted seven spot.

In the use of the various flooding techniques, it has become a common expedient to add various polymeric thickening agents to the drive fluid to increase its viscosity to a point where it approaches that of the oil to be displaced, thus improving the displacement of oil from the formation. The polymers used for this purpose are often said to be used for "mobility" control.

Another problem encountered is that certain injected drive fluids may be much lighter than the reservoir fluids and thus separate by gravity, rising toward the top of the flowing region and resulting in the bypassing of the lower regions. This phenomena is known as gravity override.

Also encountered in the use of the various flooding techniques is a situation caused by the fact that different regions or strata often have different permeabilities. When this situation is encountered, the drive fluid may preferentially enter regions of higher permeability due to their lower resistance to flow rather than the regions of low permeability where significant volumes of oil often reside.

It therefore is often desirable to plug the regions of high permeability, or "thief" zones, either partly or entirely, so as to divert the drive fluid into regions of lower permeability. The mechanical isolation of these thief zones has been tried but vertical communication among reservoir strata often renders this method ineffective. Physical plugging of the high permeability regions by cements and solid slurries has also been tried with varying degrees of success; however, these techniques have the drawback that still-productive sites may be permanently closed.

As a result of these earlier efforts, the desirability of designing a slug capable of sealing off the most permeable layers so that the drive fluid would be diverted to the underswept, "tighter" regions of the reservoir, became evident. This led to the use of oil/water emulsions, as well as gels and polymers for controlling the permeability of the formations. This process is frequently referred to as "flood conformance" or "profile control", a reference to the control of the vertical permeability profile of the reservoir. Profile control agents which have been proposed include oil/water emulsions, gels, e.g., lignosulfate gels and polymeric gels, with polymeric gels being the most extensively applied in recent years.

Among the polymers so far examined for improving flood conformance are polyacrylamides, polysaccharides, celluloses, furfural-alcohol and acrylic/epoxy resins, silicates and polyisocyanurates. A major part of this work has been conducted with the polyacrylamides, both in their normal, non-crosslinked form, as well as in the form of metal complexes, as described, for example, in U.S. Pat. Nos. 4,009,755, 4,069,869 and 4,413,680. In either form, the beneficial effects derived from these polyacrylamides seem to dissipate rapidly due to shear degradation during injection and sensitivity to reservoir brines, low pH and high temperature. To overcome these problems and to achieve deeper polymer penetration into the reservoir, dilute solutions of these polymers have sometimes been injected first and then complexed in situ.

Another group of polymeric thickeners which has received considerable attention for use in improving flooding are polysaccharides, particularly those produced by the action of bacteria of the genus Xanthomonas on carbohydrates. For example, U.S. Pat. Nos. 3,757,863 and 3,383,307 disclose a process for mobility control by the use of polysaccharides.

U.S. Pat. Nos. 3,741,307, 4,009,755 and 4,069,869 disclose the use of polysaccharides in the control of reservoir permeability. U.S. Pat. No. 4,413,680 describes the use of crosslinked polysaccharides for selective permeability control in oil reservoirs.

U.S. Pat. No. 3,908,760 describes a polymer waterflooding process in which a gelled, water-soluble Xanthomonas polysaccharide is injected into a stratified reservoir to form a slug, band or front of gel extending vertically across both high permeability and low permeability strata. This patent also suggests the use of complexed polysaccharides to block natural or man-made fractures in formations.

Another type of polysaccharide which has been experimented with in the area of profile control is the non-xanthan, heteropolysaccharide S-130. S-130 is a member of a group of welan gums and is produced by fermentation with a microorganism of the genus Alcaligenes. Another welan gum heteropolysaccharide, known as S-194, is also produced by fermentation with a microorganism of the genus Alcaligenes. A notable characteristic of the heteropolysaccharide S-130 is that it develops a high viscosity in saline waters. This is particularly so in brines which contain divalent cations such as $Ca^{2+}$ and $Mg^{2+}$ or monovalent cations such as $Na^+$ and $K^+$. U.S. Pat. No. 4,658,898 discloses the use of welan gum S-130 in saline waters. Crosslinking with trivalent cations, such as chromium, aluminum, zirconium and iron is also disclosed. Additionally, crosslinking with organic compounds containing at least two positively charged nitrogen atoms is disclosed in U.S. Pat. No. 4,658,898; while Ser. No. 283,399, filed on Dec. 12, 1988, discloses welan gums crosslinked with phenolic resins or mixtures of phenols and aldehydes.

The use of various block copolymers for mobility control in waterflooding operations is described in U.S. Pat. Nos. 4,110,232, 4,120,801 and 4,222,881. Chung et al., U.S. Pat. No. 4,653,585, disclose the use of block copolymers, which may be crosslinked with polyvalent metal ions, for use as permeability control agents in enhanced oil recovery applications.

While a number of the different compositions discussed have been proposed for permeability control, some of these compositions may be unsuitable for use as permeability control agents under certain circumstances. For example, the polymers of Chung et al, may not be effectively crosslinked with polyvalent metal ions under all conditions encountered in the enhanced oil recovery applications, e.g., in acidic conditions commonly found in carbon dioxide ($CO_2$) flooding operations. Polyacrylamides display instability in the presence of high brine concentration at temperatures over 70° C. Xanthan gums are very brine tolerant but display thermal instability, even at temperatures below 60° C. Still, other polymers are unsuitable as permeability control agents when used in conjunction with steam flooding operations. This is due to the fact that they lose their structural integrity at the high temperatures generated during such operations. In view of the severe conditions which include both high brine concentrations, elevated temperatures or both, so-called hostile environment polymers, such as those marketed by the Phillips Petroleum Company of Bartlesville, OK and the Hoechst Celanese Corporation of Somerville, NJ have been developed.

One problem that has continually attended the use of polymeric mobility and profile control agents is that thickened aqueous solutions, such as the polysaccharide solutions, may be more difficult to inject into the reservoir than less viscous solutions. Also, the shear conditions attendant during injection may degrade the polymer and reduce its effectiveness upon entering the reservoir. To overcome injectivity problems, U.S. Pat. No. 3,208,518 proposes the use of polymer solutions of controlled pH which undergo a delayed increase in viscosity after the solution enters the formation and the pH changes by neutralization of acidic or basic constituents in the solution by materials present in the reservoir.

In general, there are two basic ways to deliver polymer gels into the formation. The first method is to inject gelled polymer into the formation. This is the so-called surface gelation method. The advantage of this method is that the polymer will enter the loose, more highly permeable zone in preference to the tighter, low permeability zone, due to the high viscosity of the gelled polymer. Another advantage is that gelation is ensured since the gel is prepared at the surface. The disadvantage of this method is that the polymer gel will probably not penetrate far enough to block a high pore volume of the designated zone at low pumping pressures and low pumping rates. This is particularly so when the pressure drop occurs rapidly within a small radius of the injection wellbore. At high pumping pressures and flow ratres, there are increased risks of fracturing the reservoir and degrading the gel structure by high shear forces, as those skilled in the art will readily understand.

The second method is the so-called in situ gelation method, in which separate slugs of polymer, one containing an inactive crosslinker (such as dichromate), the other, an activator (reducing agents such as thiourea and bisulfite), are injected sequentially into the reservoir. Gelation occurs when the two parts meet in the reservoir. With this method, shear degradation is reduced and the penetration of polymer is improved because of the lower viscosity of the ungelled polymer. However, because of its low viscosity, the non-crosslinked polymer slug can also enter the tight zone and cause its blockage, defeating the purpose of the profile control treatment. Another disadvantage of this method is that there is no guarantee that the two slugs of treatment will be placed in the same area and mix well enough to form a strong gel.

To improve upon the aforementioned polymer delivery methods, a method for delivering gelled polymer into the formation in a manner which ensures the formation of a strong gel when the polymer is correctly placed in the formation and which avoids the problems associated with high injection pressures, pumping rates and shear forces would be desirable. U.S. Pat. No. 4,606,407, the inventor of which is also the inventor of the present subject matter, discloses a method in which polymers are gelled in a controlled manner through the use of rapid and delayed polyvalent metal gelling agents. The gelling agents disclosed are capable of forming two or more coordinate bonds with donor atoms in the polymers. Polymers disclosed within U.S. Pat. No. 4,606,407 as having the requisite donor atoms for forming coordinate linkages include polyacrylamides, other acrylic polymers and polysaccharides. In the practice of the method of U.S. Pat. No. 4,606,407, a solution or dispersion of the polymer is first lightly gelled on the surface through the use of the rapid polyvalent metal crosslinking agent. The delayed polyvalent metal crosslinking agent is also added to the solution or dispersion so as to effect complete gelation at a later period of time when the desired depth of penetration has been achieved. U.S. Pat. No. 4,606,407 is hereby incorporated by reference in its entirety for all that it discloses.

While transition metal-complexed polymer gels have been successful in many profile control applications, several limitations may interfere with their use in the preparation of suitable gel-forming compositions. One limitation is that each metal is reactive only to certain functionalities. For example, Al, Cr, and Zr are reactive only to amide and carboxyl groups, while Ti is reactive to hydroxyl groups. A proper match of the polymer with the appropriate metal crosslinker must be considered. There is presently no known general metal crosslinker for all types of polymeric materials. Carbonate, bicarbonate, and sulfate anions are known to interfere with the gelation of Cr, Zr and Al. Another limitation is that pH control is important for most metal crosslinking reactions. It is easy to control pH when the gel is prepared at the surface but, as can be appreciated, such control can be vastly more difficult when an in situ gelation process is utilized. Furthermore ligand-metal bond formation and stability may be affected by high ionic strength and the temperature of the reservoir brine. At substantially high brine concentrations and high temperatures, metal ligand bonds can dissociate due to unfavorable equilibria.

Therefore, what is needed is a method for delivering gelled polymer into the formation in a manner which ensures the formation of a strong gel when the polymer is correctly placed in the formation, irrespective of reservoir type and specific conditions. The method should also avoid the problems associated with high injection pressures, pumping rates and shear forces.

SUMMARY OF THE INVENTION

According to the present invention, there is provided a process for use with a polymer which is crosslinkable by reaction with an amino resin, which comprises the steps of determining a period of time within which full gelation of the polymer is to be achieved; preparing a gel-forming aqueous-based mixture comprising the polymer, a rapid amino resin crosslinking agent and a delayed amino resin crosslinking agent, the gel-forming aqueous-based mixture capable of complete gelation within the period of time so determined; partially gelling the aqueous-based mixture by reacting the polymer with the rapid amino resin crosslinking agent which is effective to complete the partial gelation by crosslinking the polymer within four hours; and fully gelling the aqueous-based mixture by reacting the polymer with the delayed amino resin crosslinking agent which is effective to complete the full gelation by crosslinking the polymer within the period of time so determined. When used in a process to enhance the recovery of oil, the polymeric mixture, which may be in the form of a solution or dispersion, is initially gelled to a limited degree on the surface by the rapid amino resin crosslinking agent. The delayed amino resin crosslinking agent will effect complete gelation at a later time when the desired depth of penetration is achieved within the subterranean formation. The total concentration of amino resin crosslinking agents will determine the final strength of the fully gelled polymer.

The initial partial gelation increases the viscosity of the polymer solution or dispersion to impart selectivity to enter only the high permeability zones of the subterranean oil-bearing formation. At the same time, since it is only partially gelled, the polymer mixture is able to be pumped deep into the formation, with greater ease, than a fully gelled mixture. Full gelation by the delayed amino resin crosslinking agent will occur when the planned treatment depth is achieved. Since the full gelation is not developed during the delivery period, unnecessary degradation of gel structure by shear forces is minimized. Such a process, wherein gelation is tailored to a specific application to achieve the aforementioned desirable properties, is said to be a programmed gelation process. A method of enhancing the recovery of oil from a subterranean oil-bearing formation is also provided.

DETAILED DESCRIPTION OF THE INVENTION

In the method of the present invention, a viscous or thickened liquid comprising a partly gelled polymer is injected into a subterranean oil-bearing formation in order to block the more highly permeable regions in a selective manner. The liquid which is injected is a solution or dispersion of the partly gelled polymer in water. For the purposes of this description, the liquid will subsequently be referred to as a solution despite the fact that in some cases the polymer will actually be present as a dispersion, rather than a solution in the true sense of the term.

The polymer is injected into the formation through an injection well which extends from the surface of the earth into the formation. In addition, a production well is situated on a horizontal distance or offset from the injection well so that, once the polymer has been placed in the formation to control the permeability and the flooding operation begun in the normal manner by injecting the flooding fluid, e.g. water through the injection well, recovery of the oil displaced by the flooding fluid can be made through the production well.

Any water-soluble or water-dispersible polymer capable of forming aqueous gels in the presence of an organic crosslinking agent is envisioned for use in the practice of the present invention. The polymer which is used to produce the desired gel may be of natural or synthetic origin. Because the multiple step gelation reaction depends upon the formation of coordinate crosslinkages, the polymer should contain functional groups such as $-NH_2$, $-CONH_2$, $-OH$, $-SH$, or $-COOH$. Such functional groups may be introduced into the polymer either by the use of appropriately substituted monomers, by grafting techniques or by reaction of a pre-formed polymer with a suitable reagent for introducing the desired functional groups. As can be appreciated by those skilled in the art, the aforementioned reactive groups are not meant as a limitation as to the types of polymers useful in the practice of the present invention, but are presented for purposes of example.

Suitable polymers include acrylic polymers, e.g. polyacrylic acid, polyacrylic acid esters, polyacrylamide, polymethacrylic acid, polymethacrylic acid esters, copolymers of unsaturated carboxylic acids, such as acrylic acid or methacrylic acid with olefins such as ethylene, propylene, and butylene, vinyl polymers such as polyvinyl acetate and polyvinyl alcohol, polymers of unsaturated dibasic acids and anhydrides such as maleic anhydride, and their copolymers with other monomers such as ethylene, propylene, styrene and methylstyrene. Other exemplary polymers are described in U.S. Pat. No. 3,208,518, which is hereby incorporated by reference for such details.

Preferred polymers include the various polyacrylamides and related polymers which are either water-soluble or water-dispersible and which can be used in an aqueous medium with the gelling agents described herein to yield an aqueous gel. These can include the various substantially linear homopolymers and copolymers of acrylamide and methacrylamide. By substantially linear is meant that the polymers are substantially free crosslinking between the polymer chains. The polymers can have up to about 50 percent of the carboxamide groups hydrolyzed to carboxyl groups. However, as the degree of hydrolysis increases, the polymers often become more difficult to disperse in brines, especially hard brines. As used herein, unless otherwise specified, the term "hydrolyzed" includes modified polymers wherein the carboxyl groups are in the acid form and also such polymers wherein the carboxyl groups are in the salt form, provided such salts are water-dispersible. Such salts include the ammonium salts, the alkali metal salts, and others which are water-dispersible. Hydrolysis can be carried out in any suitable fashion, for example, by heating an aqueous solution of the polymer with a suitable amount of sodium hydroxide.

Examples of copolymers which can be used in the practice of the invention include the water-dispersible copolymers resulting from the polymerization of acrylamide or methacrylamide with an ethylenically unsaturated monomer. It is desirable that sufficient acrylamide or methacrylamide be present in the monomer mixture to impart to the resulting copolymer the above-described water-dispersible properties. Any suitable ratio of monomers meeting this condition can be used. Under proper conditions of use, examples of suitable ethylenically unsaturated monomers include acrylic acid, methacrylic acid, vinylsulfonic acid, vinylbenzylsulfonic acid, vinylbenzenesulfonic acid, vinyl acetate, acrylonitrile, methyl acrylonitrile, vinyl alkyl ether, vinyl chloride, maleic anhydride, vinyl-substituted cationic quaternary ammonium compounds, and the like. Various methods are known in the art for preparing said copolymers. For example, see U.S. Pat. Nos. 2,625,529, 2,740,522, 2,727,557, 2,831,841, and 2,909,508. These copolymers can be used in the hydrolyzed form, as discussed above for the homopolymers.

A group of copolymers useful in the practice of the present invention are the copolymers of acrylamide or methacrylamide and a monomer such as the well known 2-acrylamido-2-methyl-propanesulfonic acid (AMPS®) monomer. (AMPS® is the registered trademark of the Lubrizol Corporation of Cleveland, OH.) Useful monomers, such as the AMPS® monomer, and methods for their preparation are described in U.S. Pat. Nos. 3,507,707 and 3,768,565, the disclosures of which are incorporated by reference. The AMPS® monomer is commercially available from the Lubrizol Corporation. The alkali metal salts, such as sodium 2-acrylamido-2-methylpropane sulfonate are also useful in the practice of this invention. These are also readily available.

Copolymers of acrylamide with said AMPS® monomer, and/or its sodium salt, are known and useful in the practice of this invention. For an example of such a copolymer, see the above-mentioned U.S. Pat. No. 3,768,565. A number of these copolymers are available from Hercules Incorporated, Wilmington, Del.; for example, Hercules SPX-5024, a 90:10 acrylamide/AMPS® sodium salt copolymer; Hercules SPX-5022, an 80:20 acrylamide/AMPS® sodium salt copolymer; Hercules SPX-5023, a 50:50 acrylamide/AMPS® sodium salt copolymer; and Hercules SPX-5025, a 30:70 acrylamide/AMPS® sodium salt copolymer.

Another group of copolymers useful in the practice of the invention are the copolymers of acrylamide or methacrylamide with a monomer such as those which are the subject of U.S. Pat. No. 3,573,263, the disclosure of which is incorporated by reference in its entirety. These useful monomers include the well known commercially available material (acryloyloxyethyl) diethylmethyl ammonium methyl sulfate, commonly referred to as DEMMS and the commercially available material (methacryloyloxyethyl) trimethylammonium methylsulfate also known as MIMMS.

Copolymers of acrylamide with said DEMMS monomer are commercially available, for example, an 80:20 acrylamide/DEMMS copolymer. Copolymers of acrylamide with said MtMMS monomer are also commercially available, for example, Hercules Reten® 210, a 90:10 acrylamide/MTMMS copolymer; and Hercules Reten® 220, an 80:20 acrylamide/MTMMS copolymer.

A particularly preferred polymeric material for use in the practice of this invention is the class of high molecular weight vinyl lactum polymers and copolymers disclosed in U.S. Pat. No. 4,644,020, which is hereby incorporated herein in its entirety. An example of a commercially available copolymer of this type is Phillips HE-B®, which is a copolymer of N-vinyl-2-pyrrolidone and acrylamide. This thermally stable, brine tolerant copolymer is available from Phillips Petroleum Company, Inc., of Bartlesville, OK.

A preferred class of biopolymers which may be used include the polysaccharides produced by the action of bacteria of the genus Xanthomonas on a carbohydrate. The Xanthomonas polysaccharides, their method of preparation, their use in various applications in the petroleum industry are well known and are described, for example, in U.S. Pat. Nos. 3,243,000, 3,305,016, 3,208,518, 3,810,882 and 4,413,680, to which reference is made for disclosures of these materials, their preparation and their use. Other polymers of natural origin that may be used include cellulose polymers, e.g., the hydroxyalkyl celluloses and carboxyalkyl celluloses and their alkali metal and ammonium salts, as described in U.S. Pat. Nos. 4,009,755, 4,069,869 and 4,413,680, to which reference is made for a detailed description of these polymers.

A particular polysaccharide which is commercially available and is preferred for use in the present invention is the ionic polysaccharide B-1459 produced by fermentation of glucose with the bacterium Xanthomonas Campestris (NRRL B-1459, U.S. Department of Agriculture). This polysaccharide is produced by culturing the bacterium Xanthomonas Campestris in a well aerated medium having a pH of about 7 which contains commercial glucose, organic nitrogen sources, dipotassium hydrogen phosphate and appropriate trace elements. This polymer is available from the Kelco Chemical Company under the trade name "Kelzan", from Pfizer under the trade name "Flocon" and from other commercial sources.

Another biopolymer which may be employed in the practice of the invention disclosed herein is the nonxanthan welan gum heteropolysaccharide biopolymer S-130 produced by fermentation under aerobic conditions of a bacterium of the Alcaligenes species, ATCC 31555. This polysaccharide is described in U.S. Pat. No. 4,342,866 to which reference is made for a description of it and of the method by which it may be produced. S-130 is commercially available from the Kelco Oil Field Group, a division of Merck and Co., Inc.

The polymers are generally used at concentrations ranging from 1,000 to 5,000 ppm in order to achieve the desired gel consistency; in most cases, however, concentrations of 1,000 to 3,000 ppm will be adequate and about 2,000 ppm is normally preferred, although reservoir conditions may require other concentrations.

The polymer is initially dissolved or suspended in water and is the gelled in two stages, preferably by the use first of a rapid crosslinking agent and second, by the use of a delayed crosslinking agent. The rapid crosslinking agents can generally be considered as those which would, if present at a sufficient concentration, gel the polymer completely within four hours. Delayed crosslinking agents, by contrast, will be those which would gel the polymer completely over a period of time in excess of four hours and normally require a period of a few days or longer for complete gelation. The period of time which the crosslinking agent requires to effect gelation is not, however, critical, because the objective underlying the use of two different agents is to permit the introduction of a partly gelled polymer into the formation and, subsequently, to complete gelation after the polymer is in place in the formation so that a firm, crosslinked gel is formed. As can be appreciated, it would therefore be possible to employ a delayed crosslinking agent to cause the initial gelation but, because this would cause an inordinate delay in the progress of the work, it will normally not be employed. Generally, the rapid crosslinking agents with a gelation time of not more than four hours will cause sufficient gelling to impart selectivity to the overall solution to be injected within a conveniently short period of time. Because the effect of the rapid crosslinking agent is complete within a reasonably short period of time, it is possible to wait until this partial crosslinking is complete, to ensure that the solution which is injected has the optimum properties, e.g. selectivity, viscosity, shear stability, for injection. If a crosslinking agent with a longer gelation time were initially used, the gelation would continue over an extended period of time so that if any undue delays in the injection of the slug were encountered, the portions of the solution which would be injected later would be more highly gelled than the initial portions and so the injection process might not be performed under optimal conditions.

The particular crosslinking system employed in the present invention is one selected from the family of amino resins. Amino resins are prepared by reacting formaldehyde with urea or melamine. These resins, also known to those skilled in the art as aminoplasts, are very effective crosslinking agents. When used with the preferred polymers described above, stable gels may be obtained, even at pH conditions under which polyvalent metal crosslinking systems may be ineffective or form unstable gels. Thus, the crosslinking agents disclosed herein form gels which are stable even at acidic formation conditions, e.g., at pH values of about 5.5 or less, such as the conditions encountered in $CO_2$ flooding operations.

The amino resin, to be effective in the practice of the present invention, must be soluble or dispersible in an aqueous medium. Non-limiting examples of resins which can be used are melamine formaldehyde, urea formaldehyde, ethylene and propylene urea formaldehyde, triazone, uran and glyoxyl resins. The amount of amino resin required for polymer crosslinking is about 0.1:1 to about 10:1 by weight of the polymer to the amino resin. The manner of preparation is described in Kirk-Othmer, ENCYCLOPEDIA OF CHEMICAL TECHNOLOGY, Third Edition, Volume 2, John Wiley and Sons, 1978, at pages 440-467, the contents of which are incorporated herein by reference in their entirety.

The crosslinking system preferred for use in the programmed gelation method of the present invention is one selected from the family of melamine resins. Melamine resins are derived from a reaction of melamine and formaldehyde at a molar ratio of melamine to formaldehyde of between about 1 to about 6, with a ratio of between about 3 to about 6 commonly employed. Such resins form the group of rapid crosslinking agents for use in the practice of the present invention and have the following structure:

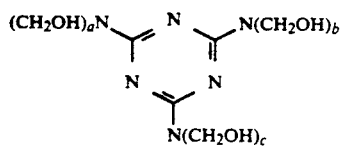

wherein a, b, c = 0, 1, 2; and, $0 < a+b+c < 6$. Such melamine formaldehyde resins can crosslink a polymer from the group of polymers disclosed herein in a short period of time, normally four hours or less. The methylol group, $—CH_2OH$, is known to be reactive to various functionalities, such as $—NH_2$, $—CONH_2$, $—OH$, $—SH$, or $—COOH$ groups.

To modify the reactivity and solubility in organic solvents of the preferred melamine resins, the methylol groups can be alkylated with methyl, ethyl, propyl or butyl groups. The alkylated melamine resins form the group of useful delayed crosslinking agents required for the practice of the present invention. Such resins have the property that they will crosslink the group of disclosed polymers over a period of time in excess of four hours to form stable aqueous gels. A methylated melamine formaldehyde resin has the following structure:

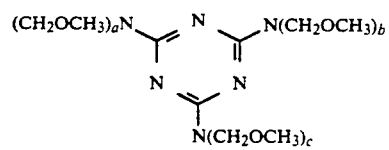

wherein a, b, c = 0, 1, 2; and, $0 < a+b+c < 6$. The preparation of alkylated melamine formaldehyde resin is well known and documented in the various preparative polymer manuals, such as *Polymer Synthesis*, by Sandler and Karo, published by Academic Press (1977), incorporated by reference for those details.

A melamine formaldehyde resin such as a trimethylol melamine can react with the aforementioned functional groups at room temperature at a pH of about 8 or less. A methylated melamine formaldehyde resin such as a hexamethyl-hexamethylol melamine requires higher temperatures and an acid catalyst to become an active crosslinker. A partially methylated melamine formaldehyde resin will be partially reactive at low temperatures without an acid catalyst but will become fully reactive in the presence of such a catalyst. A latent, heat activated catalyst is preferred for use in the practice of the method of the present invention. Particularly preferred catalysts include anhydrides of carboxylic acids and the ammonium salts of strong acids, such as p-toluenesulfonic acid and dihydrophosphate.

Melamine formaldehyde resins used in the practice of the present invention can be commercial products such as the partially methylated and hexamethoxymethyl resins produced by the American Cyanamid Company of Wayne, NJ and sold under the trademarks "Cymel ®" and "Parez ®". As mentioned previously, the resin employed must be one that is soluble or dispersible in an aqueous medium. For the alkylated melamine formaldehyde resins, it is known that methyl- and ethyl-group alkylation does not adversely affect solubility, while propyl- and butyl-group alkylation will begin to detract from the resin's ability to be dispersible in an aqueous medium.

As described above, the purpose of the initial, partial gelation is to give the polymer sufficient selectivity to prevent it from entering the more permeable regions of the formation but, at the same time to keep the gel strength low enough so that high injection rates and pressures are unnecessary and to permit the polymer to be injected deeply into the formation so that a large volume of the more highly permeable regions are plugged. The degree of gelation at this stage should therefore be controlled so as to meet these objectives. Because this will depend upon the permeabilities which are encountered in the formation and to the extent to which the more permeable regions are to be selectively plugged, the extent of gelation will be selected by empirical means and controlled by the amount of crosslinking agent used. Because a further degree of gelation is to take place once the polymer is in place in the formation, the amount of crosslinking agent used at this stage (relative to the polymer) should not be so great as to be capable of taking up all of the available crosslinking sites on the polymer. The total amount of the polymer to be employed will, of course, depend upon the volume of the formation which is to be treated and will itself be determined by empirical means. The gel strength and size of the slug to be selected for a particular field application will depend upon reservoir and fluid properties, the degree of stratification, the extent of multi-zonal injection and commingled production, variation and symmetry of well spacing, and oil/water mobility ratio. Because the final strength of the polymer gel is determined by the total amount of crosslinking, the final gel strength will be dependent upon the nature of the polymer, the number of crosslinking sites available, and the total amount of crosslinking agents used, up to the necessary amount to bring about complete crosslinking. Thus, in general the final gel strength of a given polymer may be determined by the total amount of crosslinking agent used, relative to the total amount of the polymer. Higher gel strengths permit higher flooding pressures to be employed without risk of polymer disintegration.

As a result of the number of empirical factors, it is not possible to indicate the exact amounts of polymer and crosslinking agents which will be used in all applications and at all times. However, as a general guide, when using the preferred Xanthomonas polysaccharides, the amount of the polymeric material will range from about 1000 to about 4000 ppm in the solution and, preferably between about 1500 to about 3000 ppm. For the preferred melamine formaldehyde crosslinking agents, the amount required for complete crosslinking will generally be from about 0.1 to 1 to about 10 to 1 by weight of the polymer to the total amount (rapid plus delayed crosslinking agents) of melamine resins, with the total amount of rapid and delayed crosslinking agents adjusted to provide complete polymer crosslinking. In general, the amount of viscous liquid which may be injected into the stratified formation may be from about 10% to about 100% of the pore volume of the more highly permeable strata or stratum.

When a xanthan or welan gum polysaccharide is the polymer selected for use, the partly crosslinked solution which is injected into the stratified formation is capable of undergoing a reversible shear-thinning effect and this property may be exploited in the placement of the slug, aided by the pressure gradient around the injection well. In the vicinity of an injector, the flow rate and the associated pressure gradient are at a maximum and drop off rapidly as the radical distance from the wellbore increases. Thus, as the injected polymer solution flows outward, its apparent viscosity will be initially low and hence the slug can be readily injected. At a location sufficiently far away from the injector, for example, about 30 feet, the flow rate and pressure gradient are much reduced and the viscosity returns to its low-shear, higher value. This increased viscosity arrests, and in some cases, stops altogether the movement through the formation of the polymer slug. The delayed gelling effect then takes place to form a final polymer gel of high strength. The combination of the shear thinning effects and the programmed crosslinking of the polymer serves to provide a selective placement of viscous slugs within thief zones.

The injected fluid will be proportioned into the various reservoir strata according to their effective permeabilities and flow capacities. The blocking of the most permeable flow channels will lead to the diversion of the flooding fluid to the underswept portions the reservoir and, in turn, to improved oil recovery.

The present invention is further illustrated by the following non-limiting prophetic example:

EXAMPLE

To treat a well of moderate size, it is determined that 1,000 barrels of profile control treatment are necessary. Flocon ® 4800 xanthan polysaccharide, obtained from the Pfizer Corporation of Easton, PA, is selected as the polymer for use in the treatment. A two day period is estimated as being required to place the treatment within the desired location based upon reservoir conditions. A melamine formaldehyde crosslinking system is designed to achieve the desired programmed gelation of the polymeric material from the following ranges of materials:

TABLE

| Mixture of Crosslinking Agents for Programmed Gelation | | |
|---|---|---|
| Component | Proportion | Function |
| Methylol Melamine Formaldehyde | 5-50% | Partial gelation to impart viscosity and selectivity |
| Methylated Melamine Formaldehyde | 50-95% | Gelation occurs in the formation to give the gel full strength and rigidity |
| Acetic Anhydride | 0.01-1% | Heat activated catalyst |

The melamine formaldehyde crosslinking system is utilized at a concentration effective to fully crosslink the polymer. The initial gel strength is determined by the relative amount of methylol melamine formaldehyde (rapid crosslinking agent), the amount being within the preferred range cited in the table above. As can be appreciated, higher initial gel strength is obtained with higher concentrations of methylol melamine formaldehyde. Total melamine formaldehyde resin concentration (methylol melamine formaldehyde plus methylated melamine formaldehyde) determines final gel strength. Gelation rate is controlled by the concentration of acid catalyst used. As discussed above, to tailor the gelation reaction still further, a partially methylated melamine formaldehyde resin can be substituted in whole or in part for the fully methylated melamine formaldehyde resin listed in the table.

The gel-forming solution is prepared on the surface in a suitable tank equipped with suitable mixing means and then pumped down the well and into the formation employing conventional equipment for pumping such compositions. The solution is placed in the formation at a rate of about 20 barrels per hour and requires about two days for placement. A rigid stable gel is formed at the end of the placement period.

It is within the scope of the invention to prepare these compositions just prior to being pumped down the well, so long as the rapid crosslinking agent has sufficient time to partially gel the polymer. For example, a solution of the polymer in water can be prepared in a tank adjacent to the wellhead. Pumping of this solution through a conduit to the wellhead can then be started. Then, downstream from the tank, a suitable connection can be provided for introducing the crosslinking system. As will be understood by those skilled in the art, the rate of introduction of the crosslinking agents into the conduit will depend upon the pumping rate of the polymeric solution through the conduit. Any of the above-mentioned orders of addition can be employed in such a technique. Mixing orifices or baffles can be provided in the conduit, if desired.

Where it is desired to obtain increased sweep efficiency, the process of this invention can be used to plug a previously swept portion of a formation. The process may additionally be carried out periodically, when necessary, to achieve the desired permeability profile.

One application where the process of this invention can be utilized is during a waterflooding process for the recovery of oil from a subterranean formation. After plugging the more permeable zones of a reservoir using the process of this invention, a waterflooding process can be commenced or resumed. U.S. Pat. No. 4,479,894, issued to Chen et al., describes one such waterflooding process. This patent is hereby incorporated by reference in its entirety.

Steamflood processes which can be utilized in conjunction with the process described herein are detailed in U.S. Pat. Nos. 4,489,783 and 3,918,521 issued to Shu and Snavely, respectively. These patents are hereby incorporated by reference herein.

The process described herein can also be used in conjunction with a carbon dioxide flooding process, either alone, or in conjunction with a cyclical steam stimulation in a heavy oil recovery process to obtain greater sweep efficiency. Cyclic carbon dioxide steam stimulation can be commenced or resumed after plugging the more permeable zones of the reservoir using the process of this invention. A suitable process is described in U.S. Pat. No. 4,565,249 which issued to Pebdani et al. This patent is hereby incorporated by reference in its entirety. Increased sweep efficiency can be obtained when the process of this invention is used in combination with a carbon dioxide process for recovering oil. Prior to commencement or resumption of the carbon dioxide process, the more permeable zones are plugged in the manner disclose herein Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A process for the programmed gelation of a polymer which is crosslinkable by reaction with an amino resin, which comprises the following steps:
   (a) determining a period of time within which full gelation of the polymer is to be achieved;
   (b) preparing a gel-forming aqueous-based mixture comprising the polymer, a rapid amino resin crosslinking agent and a delayed amino resin crosslinking agent, said gel-forming aqueous-based mixture capable of complete gelation within the period of time determined in step (a);
   (c) partially gelling the aqueous-based mixture by reacting the polymer with the rapid amino resin crosslinking agent which is effective to complete the partial gelation by crosslinking the polymer within four hours; and
   (d) fully gelling the aqueous-based mixture by reacting the polymer with the delayed amino resin crosslinking agent which is effective to complete the full gelation by crosslinking the polymer within the period of time determined in step (a).

2. The process of claim 1, wherein the polymer is selected from the group consisting of polyacrylamides, polysaccharides, heteropolysaccharides, cellulose ethers and mixtures thereof.

3. The process of claim 2, wherein the rapid amino resin crosslinking agent is selected from the group consisting of melamine formaldehyde, urea formaldehyde, ethylene urea formaldehyde, propylene urea formaldehyde, triazone, uron, glyoxyl and mixtures thereof.

4. The process of claim 3, wherein the delayed amino resin crosslinking agent is selected from the group consisting of melamine formaldehyde, urea formaldehyde, ethylene urea formaldehyde propylene urea formaldehyde, triazone, uron, glyoxyl and mixtures thereof.

5. The process of claim 4, wherein the melamine formaldehyde resin is derived from a reaction of melamine and formaldehyde at a molar ratio of melamine to formaldehyde of between about 1 to about 6.

6. The process of claim 5, wherein the rapid crosslinking agent is comprised of a methylol melamine formaldehyde resin.

7. The process of claim 6, wherein the delayed crosslinking agent is comprised of an alkylated melamine formaldehyde resin.

8. The process of claim 7, wherein the alkylated melamine formaldehyde resin is alkylated with methyl, ethyl, propyl or butyl groups.

9. The process of claim 8, wherein the alkylated melamine formaldehyde resin is methylated or partially methylated melamine formaldehyde resin.

10. The process of claim 8, wherein the gel-forming aqueous-based mixture further comprises an acid catalyst.

* * * * *